(12) United States Patent
Vemuri et al.

(10) Patent No.: US 8,271,725 B1
(45) Date of Patent: Sep. 18, 2012

(54) METHOD AND APPARATUS FOR PROVIDING A HOST-INDEPENDENT NAME TO IDENTIFY A META-DEVICE THAT REPRESENTS A LOGICAL UNIT NUMBER

(75) Inventors: Hari Krishna Vemuri, Pune (IN); Thomas Cornely, Palo Alto, CA (US)

(73) Assignee: Symantec Corporation, Mountain View, CA (US)

( * ) Notice: Subject to any disclaimer, the term of this patent is extended or adjusted under 35 U.S.C. 154(b) by 1034 days.

(21) Appl. No.: 12/165,351

(22) Filed: Jun. 30, 2008

(51) Int. Cl.
*G06F 13/00* (2006.01)
*G06F 13/28* (2006.01)
*G06F 9/26* (2006.01)
*G06F 9/34* (2006.01)

(52) U.S. Cl. ............... 711/114; 711/202; 711/E12.002

(58) Field of Classification Search ................ None
See application file for complete search history.

(56) References Cited

U.S. PATENT DOCUMENTS

2004/0064460 A1* 4/2004 Pooni et al. ............ 707/100

OTHER PUBLICATIONS

"Appendix C. Multipath-usage.txt File for Red Hat, Enterprise Linux 4 Update 3," Red Hat Cluster Suite: Configuring and Managing a Cluster, downloaded from web site http://www.redhat.com/docs/manuals/csgfs/browse/rh-cs-en/ap-rhcs-dm-multipath-usagetxt.html on Oct. 8, 2008.

"SGI TPL View (devlabel.8)," Linux Man Pages, techpubs library, Version 0.5.9, SGI, Inc., Apr. 2004.
"Multipath 8, Linux Administrator's Manual," PenguinSoft, Feb. 2004.
"MAP 0285: Multipath I/O (MPIO) Problem Resolution," downloaded from web site http://publib.boulder.ibm.com/infocenter/systems/scope/hw/index.jsp?topic=/iphau/x0285.htm on Oct. 8, 2008.
"iSCSI from NetApp to ESX Server," downloaded from web site http://blog.scottlowe.org/2006/12/15/iscsi-from-netapp-to-esx-server/ on Oct. 8, 2008.
Nixon, Bob, "Logical Unit Identification," T11.3 FC-GS-4 Letter Ballot Comment, T11.3/03-430v0, Prepared Jun. 26, 2003.
Cartwright, David, "Data Storage Briefings—SCSI by name, SCSI by nature—What's it all about?", Techworld.com, Oct. 7, 2003.
"SANsurfer iSCSI HBA Manager Release Notes", Version 5.00.32, QLOGIC, Apr. 10, 2008; 5 pp.,© 2007, http://download.qlogic.com/ms/60337/release_ss_iscsi_50032.html, (printed Oct. 8, 2008).
"Guidelines for OpenVMS Cluster Configurations", Order No. AA-Q28LH-TK, Hewlett-Packard Company, Palo Alto, California, Jan. 2005, © 2005 Hewlett-Packard Development Company, L.P., 354 pp.

* cited by examiner

*Primary Examiner* — Kevin Verbrugge
*Assistant Examiner* — Eric S Cardwell
(74) *Attorney, Agent, or Firm* — Campbell Stephenson LLP

(57) ABSTRACT

A method and apparatus for providing a host-independent name to identify a meta-device that represents a Logical Unit Number (LUN) is described. In one embodiment, the method comprises processing information regarding at least one storage enclosure that comprises at least one Logical Unit Number (LUN) represented by at least one meta-device and generating at least one host-independent name based on the information regarding the at least one storage enclosure, wherein the at least one host-independent name is used to identify the at least one meta-device.

20 Claims, 3 Drawing Sheets

METHOD AND APPARATUS FOR PROVIDING A HOST-INDEPENDENT NAME TO IDENTIFY A META-DEVICE THAT REPRESENTS A LOGICAL UNIT NUMBER

BACKGROUND OF THE INVENTION

1. Field of the Invention

Embodiments of the present invention generally relate to a data storage management and, more particularly, to a method and apparatus for providing a host-independent name that identifies a meta-device to which a plurality of host computers share access through such a host-independent name.

2. Description of the Related Art

A plurality of host computers may use one or more storage devices (e.g., a storage array comprising a plurality of hard disks) for managing critical data. The one or more storage devices may be maintained in one or more storage enclosures and partitioned into a plurality of storage volumes. In a Small Computer System Interface (SCSI) configuration, the plurality of storage volumes are referred to as Logical Units, which are represented by Logical Unit Numbers (LUNs). Disk array controllers, which typically have more than one port, virtualize the disks within the array and present them to the plurality of host computers as LUNs. Furthermore, one or more LUNs of the plurality of LUNs may be represented as a meta-device. As such, the meta-device is a representation of the one or more LUNs on a particular host computer that as viewed through multiple paths (e.g., cables) from the particular host computer.

The plurality of host computers may retrieve data from and store data in the meta-device through an Applicant Programming Interface (API) for the LUNs. The data is transmitted through one or more Input/Output (I/O) paths that include a host bus adapter, cables, a storage network switch, a storage device adapter port, and, in the case of storage arrays (i.e., disk arrays), a disk controller. Multi-pathing software (e.g., Dynamic Multi-pathing software for VERITAS STORAGE FOUNDATION) manages multiple and distinct I/O paths to a particular LUN in order to maintain availability of the data.

When the LUN is shared amongst the plurality of host computers, software (e.g., an operating system) on each host computer assigns a different name to the LUN based on an I/O path to the LUN as seen by each host computer. Hence, each host computer may assign a host-centric that may include a Host Bus Adapter (HBA) instance number, a SCSI target identifier and a LUN identifier. Such information is provided by software operating on the HBA and/or the storage array. Multi-pathing software may use the Operating System assigned name or a name that is created using another host-centric algorithm. As a result, the same LUN in the storage subsystem is represented through meta-devices with different names across the plurality of host computers that share the LUN.

The assignment of different names to the same LUN causes confusion and difficulties for administrators and storage management software. Consequently, the computing environment is more error prone. Another consequence of typical host-centric names is that such names do not identify the LUN when system administrators communicate with storage administrators. Furthermore, the only LUN identifiers that can be provided in a reliable and array independent fashion are the LUN serial number. The LUN serial number may be a long hexadecimal string that would be challenge to use for day-to-day operational tasks.

Therefore, there is a need in the art for a method and apparatus for providing a host-independent name for a meta-device that is consistently used by host computers to access a LUN represented by the meta-device.

SUMMARY OF THE INVENTION

The present invention generally comprises providing a host-independent name to identify a meta-device that represents a LUN. In one embodiment, a method for providing at least one host-independent name for a meta-device to at least one host computer, comprises processing information regarding at least one storage enclosure that comprises at least one LUN and generating at least one host-independent name based on the information regarding the at least one storage enclosure, wherein the at least one host-independent name is used to identify the at least one meta-device.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1:
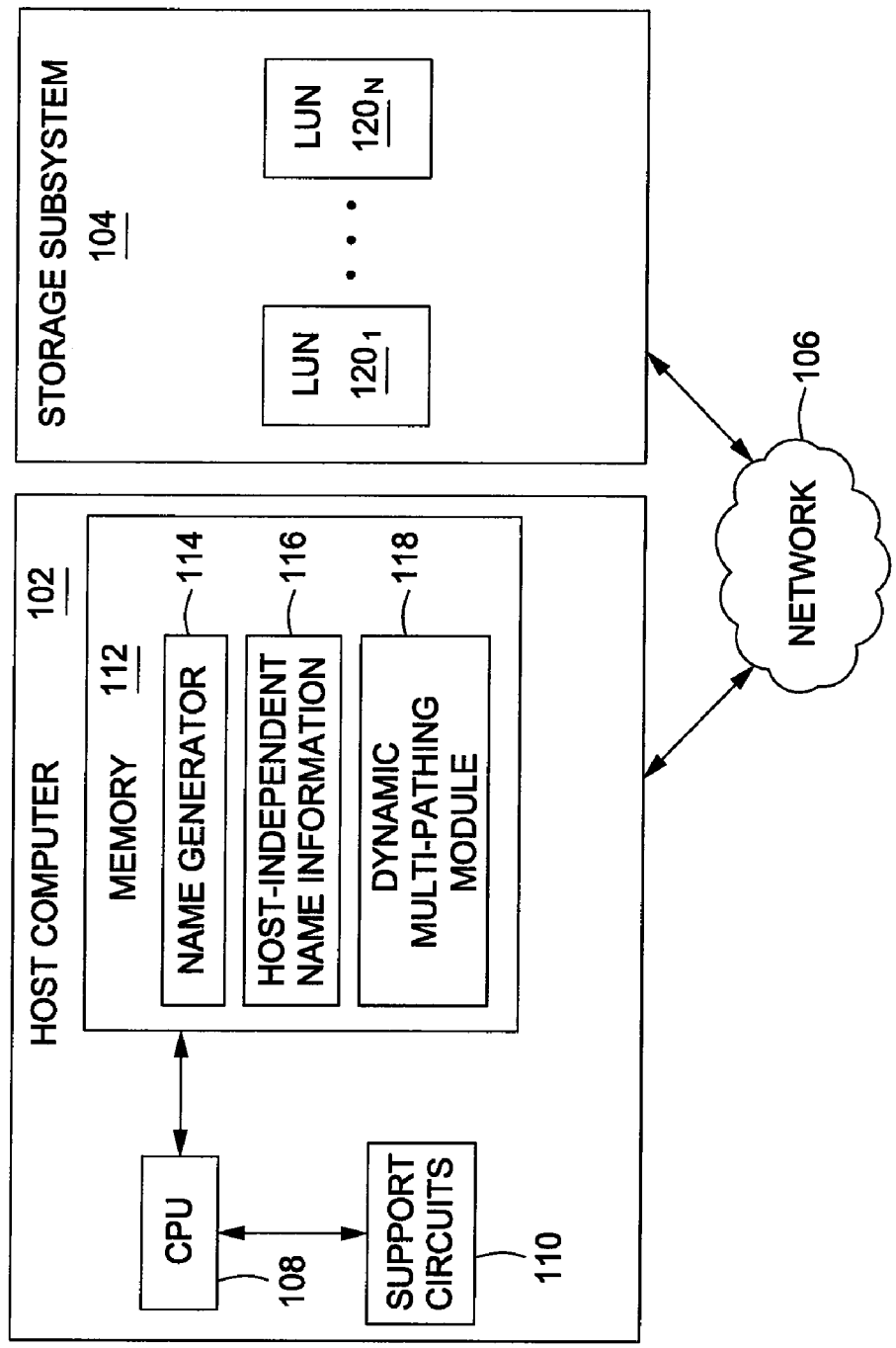
FIG. 1 is a block diagram of a system for providing a host-independent name to identify a meta-device that represents a LUN according to one embodiment of the present invention.

FIG. 1 is a block diagram of a system for providing a host-independent name to identify a meta-device that represents a LUN (e.g., a Logical Unit Number of a storage enclosure). In one embodiment, a plurality of host computers use the host-independent name to access and store data in a hard disk represented by the meta-device. The system 100 comprises a host computer 102 and a storage subsystem 104, in which each is coupled to each other through a network 106.

The host computer 102 is a computing device (e.g., a laptop, a desktop, a Personal Desk Assistant (PDA), a tablet, a mobile phone and the like) that comprises a central processing unit (CPU) 108, various support circuits 110 and a memory 112. The CPU 108 may comprise one or more commercially available microprocessors or microcontrollers that facilitate data processing and storage. Various support circuits 110 facilitate operation of the CPU 108 and may include clock circuits, buses, power supplies, input/output circuits and/or the like. The memory 112 includes a read only memory, random access memory, disk drive storage, optical storage, removable storage, and the like. The memory 112 includes various data, such as host-independent name information 116. The memory 112 includes various software packages, such as a name generator 114, a dynamic multi-pathing module 118 and a support library 120.

The storage subsystem 104 generally includes various components (i.e., hardware and software) that are configured to manage storage resources within a computing environment. The storage subsystem 104 facilitates permanent storage (i.e., backup) of critical computer data. The storage subsystem 104 includes one or more data storage devices (e.g., hard disk drives, optical drives, magnetic tape drives, a storage array (e.g., a RAID configuration) and/or the like), one or more controllers and software that provides an interface (e.g., Integrated Drive Electronics/AT Attachment (IDE/ATA), Small Computer Systems Interface (SCSI) and/or the like) to the one or more data storage devices for the host computer 102. For example, a storage array may be partitioned into a plurality of storage volumes where each storage volume is represented by a Logical Unit Number (LUN). In one embodiment, the storage subsystem 104 comprises a plurality of LUNs 120 (illustrated in FIG. 1 as a LUN $122_1$ ... a LUN $122_N$) that represent the plurality of storage volumes.

In one embodiment, the host computer 102 is a server computer that provides various computing services and resources to one or more client computers. The host computer 102 may be one of the plurality of host computers that share access to the LUN in the storage subsystem 104. As described further below, the host computer 102 uses the host-independent name to retrieve data from and store data in a LUN associated with the meta-device.

The network 106 comprises a communication system that connects computers by wire, cable, fiber optic, and/or wireless links facilitated by various types of well-known network elements, such as hubs, switches, routers, and the like. The network 106 may employ various well-known protocols to communicate information amongst the network resources. For example, the network 106 may be part of the Internet or intranet using various communications infrastructure such as Ethernet, WiFi, WiMax, General Packet Radio Service (GPRS), and the like. Furthermore, the network 106 may form a portion of a Storage Network Area (SAN) using various communications infrastructure such as Ethernet, Fibre Channel, and/or the like.

The dynamic multi-pathing module 118 includes software code for maintaining multiple I/O paths between the host computer 102 and the LUNs 120, such as VERITAS dynamic multi-pathing software. In one embodiment, the dynamic multi-pathing module 118 presents one or more host-independent names to the host computer 102 to facilitate access with a particular LUN of the LUNs 120. As a result, one or more host computers that share access to the particular LUN use a same name for identifying a meta-device that represents the particular LUN. A storage enclosure within the storage subsystem 104 exports the particular LUN to the host computer 102. The dynamic multi-pathing module 118 on the host computer creates the meta-device to represent the particular LUNs exported by the storage enclosures according to one embodiment.

In one embodiment, a support library may be used by the dynamic multi-pathing module 118 and/or the name generator 114 to interact with various components (e.g., the LUNs 120) within the storage subsystem 104. Such a support library may include an implementation of an Application Programming Interface (API) for interacting with the LUNs 120. For example, the support library may be an Array Software Library (ASL) that may be used to retrieve information regarding one or more storage enclosures within the storage subsystem 104, such as a cabinet serial number, a LUN serial number and/or an array volume ID property. In another embodiment, the name generator 114 does not use the software library to retrieve information regarding the storage enclosures that house the LUNs 122 within the storage subsystem 104.

The name generator 114 cooperates with storage array management software to identify the LUNs 122 using one or more host-independent names. The name generator 114 is configured to provide the host computer 102 with the one or more host-independent names that identify one or more meta-devices that represent the LUNs 120 within the storage subsystem 104 according to one embodiment. The one or more host-independent names facilitate shared access to the LUNs 120 for one or more host computers including the host computer 102. In one embodiment, the one or more host-independent names map directly to identifiers being used locally by the storage array management software in the storage subsystem 104 to access the LUNs 120. Furthermore, system administrators that manage the one or more host computers in a datacenter and storage administrators that manage storage arrays in the storage subsystem 104 are able to use a host-independent name to refer to a particular meta-device that represents a particular LUN.

In another embodiment, the name generator 114 cooperates with the dynamic multi-pathing module 118 to provide access to the LUNs 120 for the host computer 102. In one embodiment, the name generator 114 produces the host-independent name information 116, which is used for an I/O (Input/output) request (e.g., Read or Write operations) initiated by the host computer 102 to the dynamic multi-pathing module 118. Hence, such an I/O request includes a host-independent name to identify a particular LUN represented by a meta-device instead of host-centric name (e.g., a path). The host-independent name is consistent for each and every host computer that shares access to the particular LUN represented by the meta-device. During a failure (e.g., a failure at a network component, such as a switch or a cable), the dynamic multi-pathing module 118 maps the host-independent name to one or more alternate paths to the particular LUN.

In operation, the name generator 114 produces one or more host-independent names for one or more meta-devices based on information regarding one or more storage enclosures according to one embodiment. The one or more storage enclosures include the LUNs 120, which are represented by the one or more meta-devices. In one embodiment, the name generator 114 determines one or more classes (e.g., EMC, IBM and/or the like) for the one or more storage enclosures. Subsequently, the name generator 114 sorts one or more cabinet serial numbers in order to determine one or more indices that identify the one or more storage enclosures. In one embodiment, the name generator 114 sorts one or more cabinet serial numbers associated with a same storage enclosure class. By sorting the cabinet serial numbers, the one or more indices are not dependent upon an order in which the one or more storage enclosures were discovered by an operating system at the host computer 102. Instead, the one or more indices are dependent upon the cabinet serial numbers. As a result, another host computer besides the host computer 102 may sort the same cabinet serial numbers in a similar manner to determine the same indices according to one embodiment.

Afterwards, the name generator 114 maps unique LUN identifiers (e.g., indices, array volume ID properties and/or the like) to the LUNs 120. In one embodiment, the unique LUN identifiers may be short, user-friendly identifier discovered from the storage enclosure that houses a LUN represented by a particular meta-device. In one embodiment, the name generator 114 sorts one or more LUN serial numbers in order to determine one or more indices that identify the LUNs 120. Alternatively, the one or more storage enclosures implement an array volume identifier (ID) property for identifying a particular LUN (e.g., a disk) within a particular storage enclosure. In one embodiment, the name generator 114 populates each array volume ID property of the LUNs 120 using one or more portions of the LUN serial numbers. As a result, a particular array volume ID property may uniquely identify a particular LUN of the LUNs 120.

In one embodiment, the array volume ID property may be provided to the name generator 116 by the software library. As such, the array volume ID is a unique identifier that is native to the storage enclosure that includes the particular LUN and is claimed by the software library 120 (e.g., an Array Software Library). The name generator 116 processes the array volume ID properties associated with the LUNs 120 to determine the one or more indices that identify the particular LUN. In one embodiment, the array volume ID properties of the LUNs are used as the one or more indices.

According to one embodiment, a unique LUN identifier may be provided for the LUNs 120 that are exposed by various storage enclosures (e.g., storage arrays). For example, the name generator 114 uses a third, fourth and fifth bytes of a LUN serial number associated with a meta-device to generate a unique LUN identifier that provides an American Standard Code for Information Interchange (ASCII) representation of a Symmetrix volume number in an EMC Symmetrix storage enclosure. As another example, the name generator 114 uses a last four bytes of the LUN serial number of the meta-device to generate the unique LUN identifier that provides an ASCII representation of a Hitachi 9900 LUN device identifier (i.e., a controller unit and a LUN device ID) in Hitachi 9900 series storage enclosure.

As another example, the name generator 114 uses a last four bytes of the LUN serial number of the meta-device to generate the unique LUN identifier that provides an ASCII representation of an HP XP series LUN device identifier (i.e., controller unit and LUN device ID) in a HP XP series storage enclosure. As yet another example, the name generator 114 uses one-hundred and nineteenth and one-hundred and twentieth bytes in standard inquiry data to generate a virtual LUN number of an EMC Clariion LUN in a EMC Clariion storage enclosure. As another example, the name generator 114 uses forty-third to forty-sixth bytes of standard inquiry data to generate the unique LUN identifier that provides an ASCII representation of a unique volume ID for every LUN configured on a storage array in a IBM DS8000 storage enclosure.

In one embodiment, a host-independent name for a meta-device includes a first portion, a second portion and a third portion. The name generator 114 creates the host-independent name based on information regarding a storage enclosure that maintains the meta-device. Furthermore, the host-independent name is consistently used by one or more host computers to identify the meta-device as a destination LUN for an I/O operation. In one embodiment, the name generator 114 creates the first portion of the host-independent name using a class for the storage enclosure. For example, the first portion may be "EMC" to represent an EMC storage enclosure. The name generator 114 creates the second portion (i.e., an instance of the storage enclosure) of the host-independent name with an index for a cabinet serial number associated with the storage enclosure. For example, the second portion may be "10" or an index of ten that indicates (e.g., maps to) a tenth instance of a EMC class storage enclosure.

Additionally, the name generator 114 creates the third portion using a unique LUN identifier that includes a portion of a LUN serial number for a LUN represented by the meta-device. For example, since the unique LUN identifier may be "0x4BA", the third portion may simply be "4BA". Accordingly, the host-independent name is generated to be "EMC10_4BA" where "EMC10" identifies the EMC storage enclosure that maintains the meta-device and "4BA" identifies the LUN within the EMC storage enclosure that is represented by the meta-device. Several host computers may use "EMC10_4BA" to access the LUN. Furthermore, the host computer 102 may include the host-independent name in an I/O request communicated to the dynamic multi-pathing module 118. Since the host-independent name is not based on information specific to the host computer 102 (e.g., an order of operating system discovered meta-devices, a path visible to the host computer 102 and/or the like), the dynamic multi-pathing module 118 is able to quickly identify the LUN.

Alternatively, an external storage management computer provides one or more host computers (e.g., the host computer 102) with one or more host-independent names for identifying one or more meta-devices that represent the LUNs 120. Such an external storage management computer includes the name generator 114 and the host-independent name information 116. The external storage management computer presents the one or more host computers with the host-independent name information 116. Furthermore, the dynamic multi-pathing module 118 uses the host-independent name information 116 during communications (e.g., I/O requests) with storage array management software on the storage subsystem 104 in order to identify the one or more meta-devices and access the LUNs 120.

It is appreciated that one or more embodiments of the present invention do not include the dynamic multi-pathing module 118. As such, the name generator 114 is a component of a monolithic software package executed by the host computer 102 to identify the one or more meta-devices and access the LUNs 120. Such a monolithic software package uses one or more host-independent names that map to the LUNs 120 while communicating with storage array management software according to one embodiment. Furthermore, the monolithic software package is configured to retrieve information regarding one or more storage enclosures that house the LUNs 120 within the storage subsystem 104.

Figure 2:
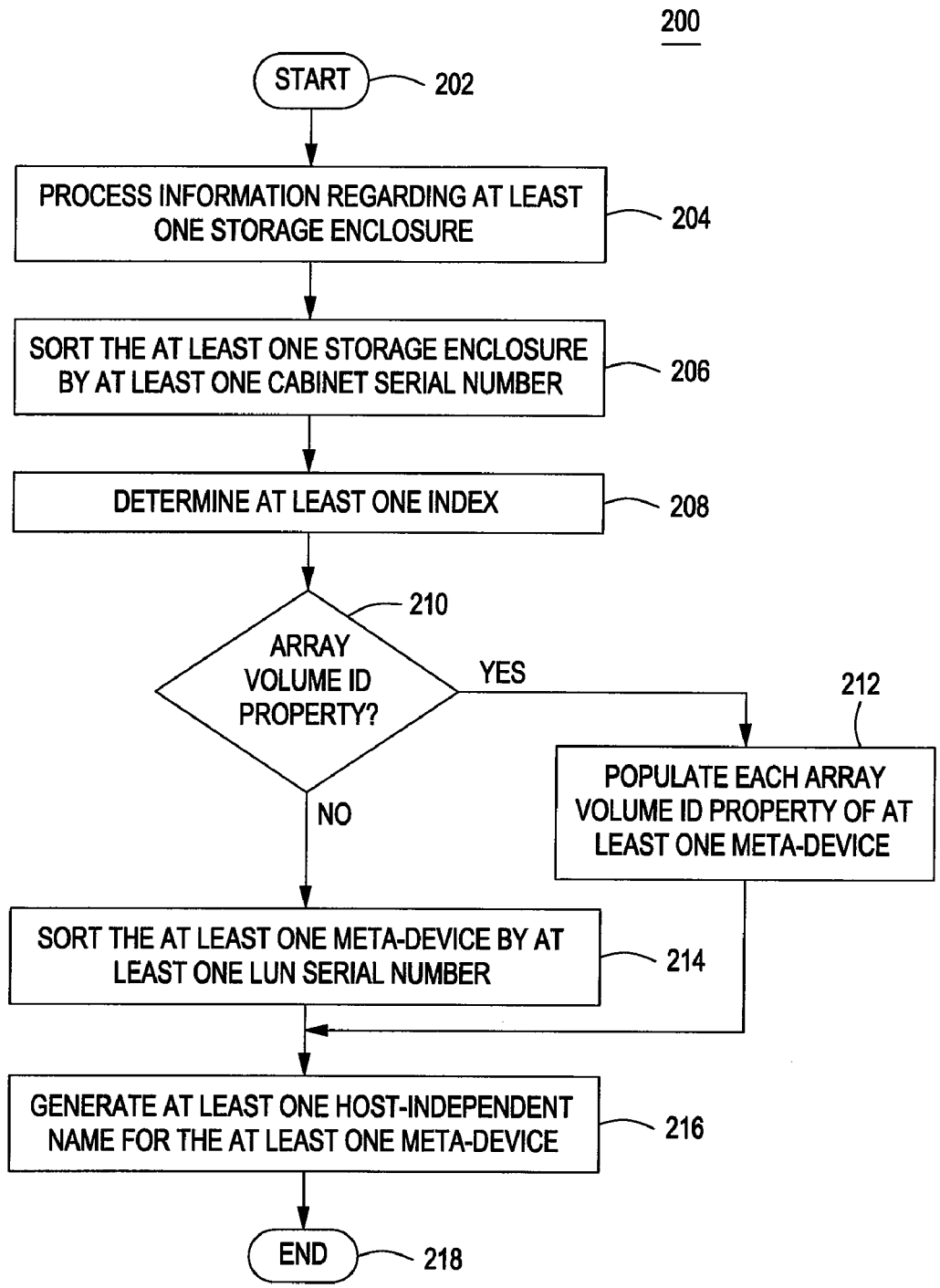
FIG. 2 is a flow diagram of a method for generating a host-independent name based on information regarding at least one storage enclosure according to one embodiment of the present invention.

FIG. 2 is a method 200 for generating a host-independent name based on information regarding at least one storage enclosure according to one or more embodiments of the present invention. The method 200 starts at step 202 and proceeds to step 204. At step 204, information regarding at least one storage enclosure is processed. At step 206, the at least one storage enclosure is sorted by at least one cabinet serial number. At step 208, at least one index is determined. At step 210, a determination is made as to whether an array volume ID property is implemented. If the array volume ID property is implemented, the method 200 proceeds to step 212. If the array volume ID property is not implemented, the method 200 proceeds to step 214. At step 212, at least one volume ID property of the at least one meta-device is populated. At step 214, the at least one meta-device is sorted by at least one LUN serial number. At step 216, at least one host-independent name for the at least one meta-device. At step 218, the method 200 ends.

Figure 3:
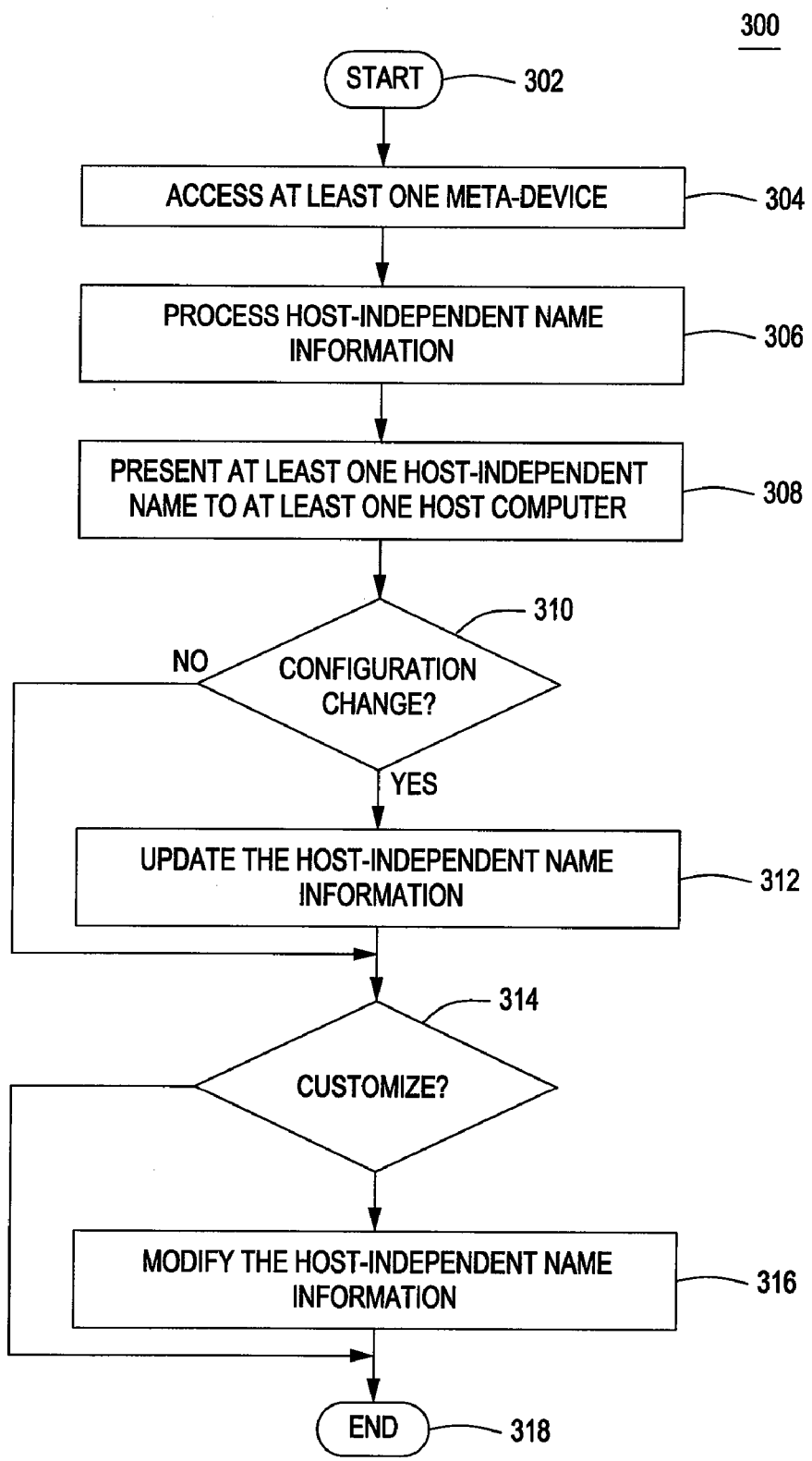
FIG. 3 is a flow diagram of a method for providing a plurality of host computers with one or more host-independent names through which one or more meta-devices are accessed according to one embodiment of the present invention.

FIG. 3 is a method 300 for providing a plurality of host computers with one or more host-independent names through which one or more meta-devices are accessed. The one or more host-independent names identify the one or more meta-devices for the plurality of host computers. The method 300 starts at step 302 and proceeds to step 304. At step 304, at least one meta-device representing at least one LUN (e.g., the LUNs 120) is accessed. At step 306, host-independent name information is processed. At step 308, at least one host-independent name is presented to at least one host computer (e.g., by an external storage management computer). At step 310, a determination is made as to whether a configuration of the at least one meta-devices changed. If the configuration of the at least one meta-device changed, the method 300 proceeds to step 312. At step 312, the host-independent name information is updated. In one embodiment, the at least one host-independent name is regenerated and stored in the host-independent name information. If the configuration of the at least one meta-device did not change, the method 300 proceeds to step 314. At step 314, a determination is made as to whether a portion of the host-independent name is to be customized. If a portion of the host-independent name is to be customized, the method 300 proceeds to step 316. If a portion of the host-independent name is not to be customized, the method 300 proceeds to step 318. At step 316, the host independent name information is modified. In one embodiment, a host-independent name is replaced with a custom host-independent name that is not based on the storage enclosure.

While the foregoing is directed to embodiments of the present invention, other and further embodiments of the invention may be devised without departing from the basic scope thereof, and the scope thereof is determined by the claims that follow.

The invention claimed is:

1. A method comprising:
   providing at least one host-independent name for a meta-device to at least one host computer, comprising
      processing information regarding at least one storage enclosure, wherein
         the information regarding the at least one storage enclosure comprises at least one Logical Unit Number (LUN),
         the at least one LUN is represented by at least one meta-device,
         the at least one meta-device comprises the meta-device, and
         the processing comprises
            determining a storage enclosure index, wherein
               the storage enclosure index identifies a storage enclosure of the at least one storage enclosure, and
            determining a meta-device index, wherein
               the meta-device index identifies a meta-device of the at least one meta-device, and
      generating at least one host-independent name, wherein
         the at least one host-independent name is generated based on the information regarding the at least one storage enclosure, and
         the at least one host-independent name identifies the at least one meta-device.

2. The method of claim 1, wherein the determining the storage enclosure index comprises:
   sorting the at least one storage enclosure, according to at least one cabinet serial number.

3. The method of claim 1, wherein the determining a meta-device, index comprises:
   sorting the at least one meta-device, according to at least one LUN serial number.

4. The method of claim 1, wherein the generating the at least one host-independent name comprises:
   generating a first portion of an host-independent name for a meta-device of the at least one meta device, wherein
      the first portion is generated using a class for a storage enclosure of the at least one storage enclosure, and
      the storage enclosure maintains the meta-device;
   generating a second portion of the host-independent name, wherein
      the second portion is generated using at least one cabinet serial number, and
      the at least one cabinet serial number is associated with least one storage device; and
   generating a third portion of the host-independent name, wherein
      the third portion is generated using an identifier, and
      the identifier is discovered from a storage enclosure that houses a LUN associated with the meta-device of the at least one meta-device.

5. The method of claim 4, wherein the identifier comprises:
   a portion of a LUN serial number of the LUN associated with the meta-device of the at least one meta-device.

6. The method of claim 1, wherein the generating the at least one host-independent name comprises:
   assigning the at least one host-independent name to the at least one meta-device.

7. The method of claim 1, wherein the generating the at least one host-independent name comprises:
   presenting the at least one host-independent name to at least one host computer, wherein
      the at least one host computer uses the at least one host-independent name to access the at least one meta-device.

8. The method of claim 1, wherein the information regarding the at least one storage enclosure comprises:
   at least one cabinet serial number associated with the at least one storage enclosure and at least one LUN serial number associated with the at least one meta-device.

9. The method of claim 8, wherein the modifying the at least one host-independent name comprises:
   replacing a host-independent name with a custom host-independent name.

10. The method of claim 8, wherein the modifying the at least one host-independent name comprises:
    regenerating the at least one host-independent name, after a configuration change.

11. The method of claim 1, further comprising:
    modifying the at least one host-independent name.

12. An apparatus comprising:
    a memory, wherein
       the memory is configured to store host-independent name information,
       the host-independent name information comprises
          at least one host-independent name, and
       the at least one host-independent name is configured to identify at least one meta-device; and
    a name generator, wherein
       the name generator is configured to generate the host-independent name information,
       the host-independent name information is based on information regarding at least one storage enclosure,
       the at least one storage enclosure comprises
          at least one Logical Unit Number (LUN),
       the at least one LUN is represented by the at least one meta-device,
       the name generator is further configured to
          determine a storage enclosure index, wherein
             the storage enclosure index identifies a storage enclosure of the at least one storage enclosure, and
          determine a meta-device index, wherein
             the meta-device index identifies a meta-device of the at least one meta-device, and the apparatus is configured to provide the at least one host-independent name to at least one host computer.

13. The apparatus of claim 12, further comprising:
a dynamic multi-pathing module, wherein
the dynamic multi-pathing module is configured to facilitate access to the at least one meta-device, using the at least one host-independent name, by virtue of being configured to present the host-independent name information to at least one host computer.

14. The apparatus of claim 12, wherein
the dynamic multi-pathing module is configured to replace a host-independent name in the host-independent name information with a custom host-independent name.

15. The apparatus of claim 12, wherein
the name generator is configured to update the host-independent name information, after a configuration change.

16. The apparatus of claim 12, wherein
the name generator is configured to regenerate the host-independent name information, after a configuration change, and
the name generator is configured to regenerate the host-independent name information based on an updated version of the information regarding the at least one storage enclosure.

17. The apparatus of claim 12, wherein
the name generator is configured to determine the storage enclosure index by virtue of being configured to
sort the at least one storage enclosure according to at least one cabinet serial number, and
the name generator is configured to determine the meta-device index by virtue of being configured to
sort the at least one meta-device according to at least one logical unit number (LUN) serial number.

18. The apparatus of claim 12, wherein
the name generator is configured to
generate a first portion of an host-independent name for a meta-device of the at least one meta device, wherein
the first portion is generated using a class for a storage enclosure of the at least one storage enclosure, and
the storage enclosure maintains the meta-device,
generate a second portion of the host-independent name, wherein
the second portion is generated using at least one cabinet serial number, and
the at least one cabinet serial number is associated with least one storage device, and
generate a third portion of the host-independent name, wherein
the third portion is generated using an identifier, and
the identifier is discovered from a storage enclosure that houses a LUN associated with the meta-device of the at least one meta-device.

19. A system comprising:
a storage subsystem, wherein
the storage subsystem comprises
at least one storage enclosure,
the at least one storage enclosure is configured to maintain at least one Logical Unit Number (LUN), and
the at least one LUN is represented by at least one meta-device; and
a computer system, wherein
the computer system and the storage subsystem are coupled to one another, and
the computer system is configured to provide at least one host-independent name for a meta-device to at least one host computer by virtue of the computer system comprising
a name generator, wherein
the name generator is configured to generate host-independent name information based on information regarding the at least one storage enclosure,
the host-independent name information comprises the at least one host-independent name,
the host-independent name information is configured to
provide access to the at least one LUN by identifying the at least one meta-device, and
the name generator is further configured to
determine a storage enclosure index, wherein
the storage enclosure index identifies a storage enclosure of the at least one storage enclosure, and
determine a meta-device index, wherein
the meta-device index identifies a meta-device of the at least one meta-device.

20. The system of claim 19, wherein
the computer is a storage management computer, and
the storage management computer is configured to facilitate shared access to the at least one LUN by virtue of being configured to present the host-independent name information to a plurality of host computers.

* * * * *